United States Patent [19]

Jefferson et al.

[11] 4,412,158
[45] Oct. 25, 1983

[54] SPEED CONTROL CIRCUIT FOR AN ELECTRIC POWER TOOL

[75] Inventors: Keith A. Jefferson, Windsor; Derek A. Lansdell, Slough, both of England

[73] Assignee: Black & Decker Inc., Newark, Del.

[21] Appl. No.: 236,040

[22] Filed: Feb. 19, 1981

[30] Foreign Application Priority Data

Feb. 21, 1980 [GB] United Kingdom ............... 8005840

[51] Int. Cl.³ .................................................. H02P 1/22
[52] U.S. Cl. ..................................... 318/257; 318/284; 318/287; 318/345 C; 318/461
[58] Field of Search ............... 318/284, 286, 287, 293, 318/257, 268, 345 C, 345 G, 326, 327, 328, 461, 463, 464; 310/50; 73/488, 494; 324/160, 161, 173, 174

[56] References Cited

U.S. PATENT DOCUMENTS

| | | | |
|---|---|---|---|
| 3,221,192 | 11/1965 | Franklin | 318/345 G |
| 3,260,827 | 7/1966 | Frenzel | 200/157 |
| 3,402,338 | 9/1968 | Thoresen | 318/310 |
| 3,523,234 | 8/1970 | Turtle | 318/681 |
| 3,536,974 | 10/1970 | Beigl et al. | 318/293 |
| 3,538,412 | 11/1976 | Graf et al. | 318/326 X |
| 3,553,556 | 1/1971 | Dosch et al. | 318/345 C X |
| 3,573,590 | 4/1971 | Reed | 318/326 X |
| 3,582,740 | 6/1971 | Reinert | 318/284 |
| 3,584,281 | 6/1971 | Reeves et al. | 318/284 X |
| 3,586,949 | 6/1971 | Spear et al. | 318/257 |
| 3,790,874 | 2/1974 | Klimo | 318/327 |
| 4,110,676 | 8/1978 | Edick et al. | 324/174 X |
| 4,314,170 | 2/1982 | Sährbacker | 310/50 X |

FOREIGN PATENT DOCUMENTS 2242201 3/1975 France .
1107938 3/1968 United Kingdom .

Primary Examiner—Ulysses Weldon
Attorney, Agent, or Firm—Ronald B. Sherer; Edward D. Murphy; Harold Weinstein

[57] ABSTRACT

A method and apparatus for controlling the rotational speed of an electronically controlled power tool in both the forward and reverse direction. When the reversing switch is placed in the reverse direction, the electronic speed control circuit automatically limits the speed of the motor to a predetermined maximum value. The speed control circuit also is adapted to sense a change in the state of the reversing switch and remove power to the motor until it coasts down to a relatively slow speed or to zero before reapplying power in the opposite direction. The speed control circuit monitors the rotational speed of the motor by means of a tachogenerator comprising a ring magnet mounted on the rearward end of the rotor shaft of the motor outboard of the commutator-end bearings and a Hall effect device mounted to the peripheral flange of a carrier which encircles the ring magnet so that the ring magnet and Hall effect device are separated by a small radially extending gap.

2 Claims, 11 Drawing Figures

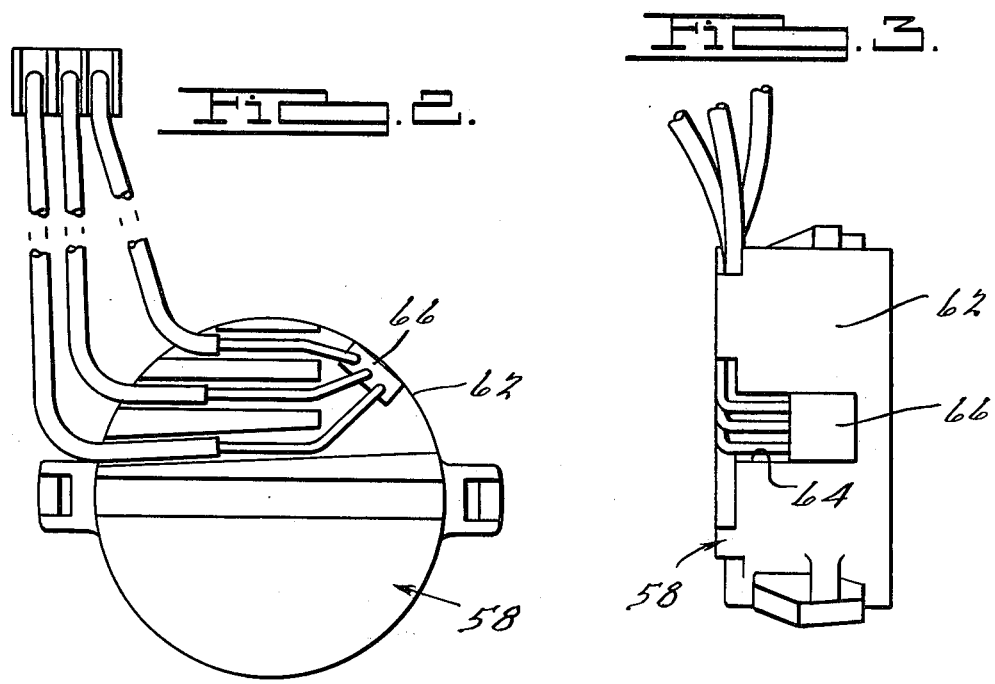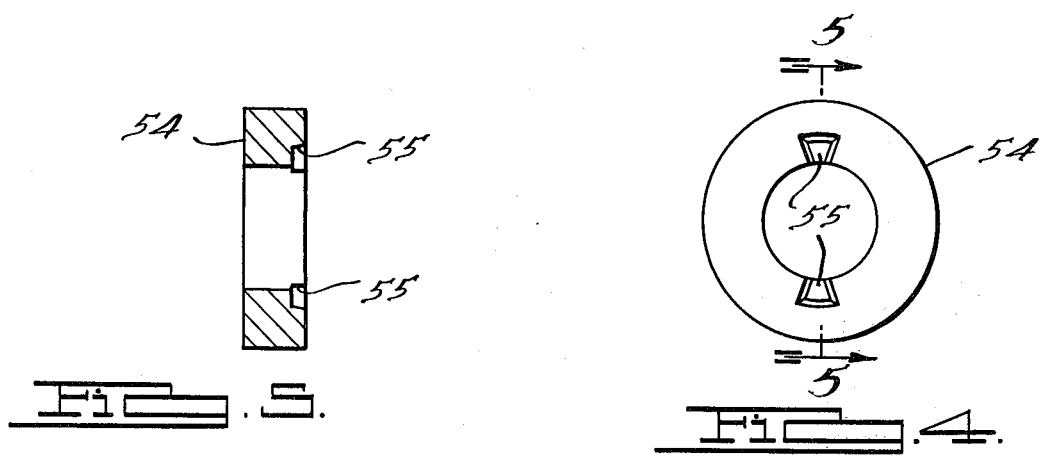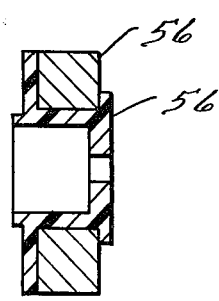

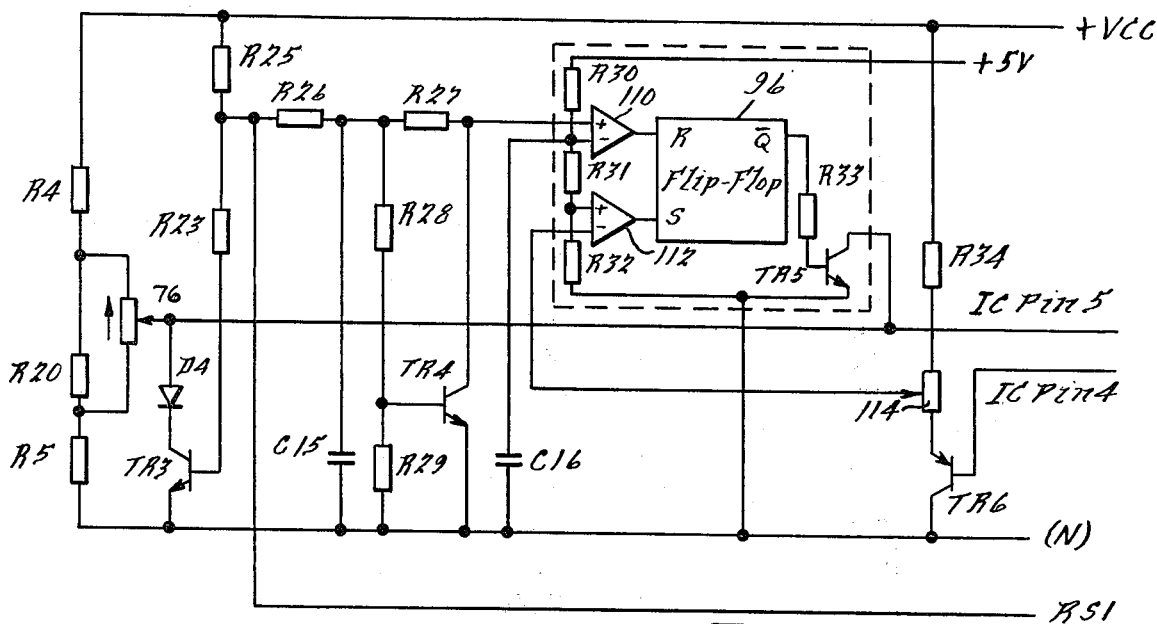
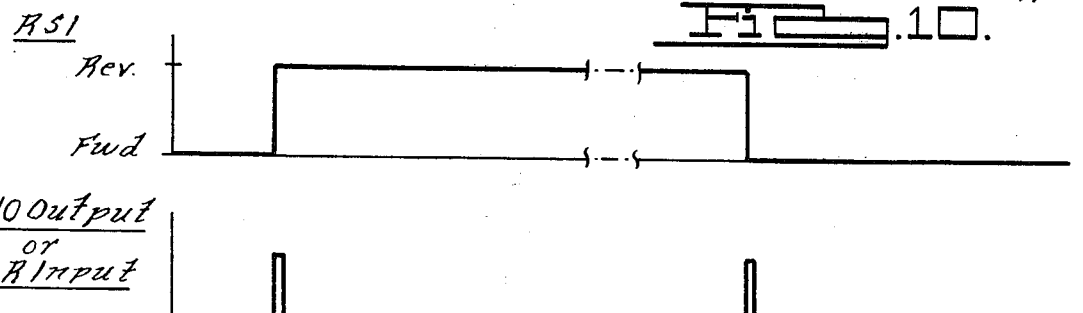
FIG. 10.
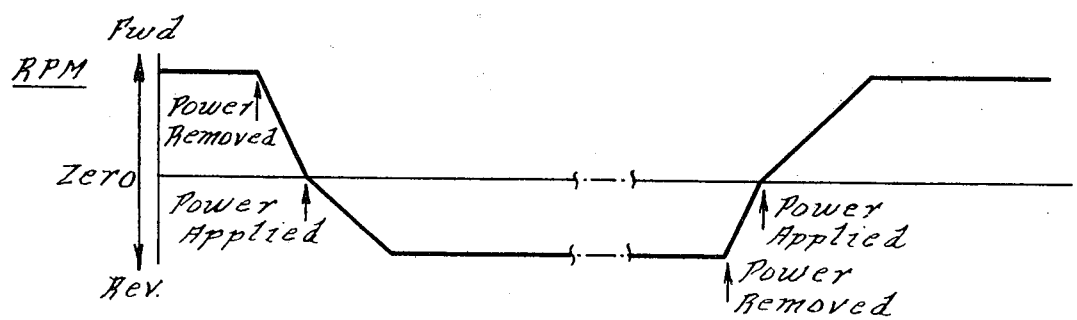
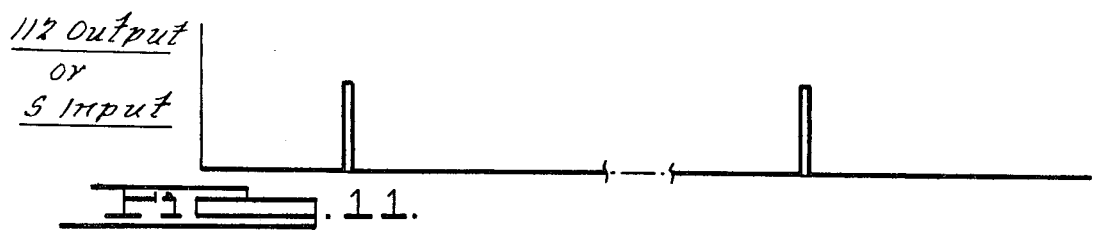
FIG. 11.

SPEED CONTROL CIRCUIT FOR AN ELECTRIC POWER TOOL

BACKGROUND AND SUMMARY OF THE INVENTION

The present invention relates to electric power tools and in particular to a method and apparatus for controlling the rotational speed of portable electric power tools, for example an electronically-controlled drill, hammer-drill, rotary hammer, and the like, in both the forward and reverse directions.

It is known to provide a speed control circuit for a portable electric power tool which provides the user with the ability to control the forward speed of rotation in a continuous manner from a preset minimum, which may be zero, to a predetermined maximum.

Conventional portable electric power tools typically employ universal motors whose commutator brushes are shifted slightly from the neutral position to provide better commutation in the forward direction of rotation and better torque characteristics. However, with such motors, if a reversing switch is provided that simply reverses the connections to the brushes, poor commutation and poor torque characteristics will result when operated in the reverse direction.

Accordingly, it is the primary object of the present invention to provide a speed control circuit for an electric power tool which is adapted to control the speed of rotation of the electric motor in both the forward and reverse directions and in which the speed control circuit is adapted to limit the rotational speed of the motor in the reverse direction to keep commutation problems to an acceptable level.

Furthermore, it is an object of the present invention to provide a reversing speed control circuit for an electric power tool that is relatively simple, economical, and convenient to install during assembly of the tool.

According to the present invention, a power tool driven by an electric motor includes a speed control circuit for enabling a user to selectably control the forward speed of rotation of the motor, means for reversing the direction of rotation of the motor, and a speed control and limiting arrangement operable when the direction of rotation of the motor is reversed to automatically limit the speed of rotation of the motor to a predetermined maximum speed while allowing variation up to the maximum speed.

In the preferred embodiment, a common control means is provided for controlling the rotational speed of the motor in both the forward and reverse directions. In particular, a set speed signal is developed in accordance with the desired speed selected by the user which is compared to an actual speed signal generated by a tachogenerator coupled to the rotor shaft of the motor. The control means is adapted to control the firing angle of a triac connected in series with the motor across the main a.c. supply line to control the speed of the motor in accordance with the result of the comparison. The speed limiting arrangement is operative when the motor is operated in the reverse direction to limit the magnitude of the set speed signal to a predetermined maximum value to thereby prevent the rotational speed of the motor from exceeding a preset level.

Additionally, the speed control circuit may also include means for sensing a change in the condition of the reversing switch and removing power from the motor until its speed drops to a relatively low level, or completely to zero, before re-applying power in the reverse direction.

The speed control circuit according to the present invention may operate on an analog or a digital basis and may incorporate a microprocessor programmed to effect the control functions described in detail below.

The speed control circuitry is preferably contained within a compartment in the housing of the power tool through which air is circulated by the cooling fan coupled to the output shaft of the motor to extract heat generated by the components of the circuit. The compartment may be isolated from the motor by a barrier which may also reduce heat transmission from the motor to the compartment.

The tachogenerator utilized in the preferred embodiment to monitor the rotational speed of the motor comprises a permanent magnet, which may be a ring magnet, secured to the rotor shaft of the motor for rotation therewith and a Hall effect device mounted on a carrier fixed with respect to the casing of the power tool. The poles of the permanent magnet are located at its periphery. The carrier has a peripheral flange on which the Hall effect device or pick-up coil is mounted and which encircles the permanent magnet being separated therefrom by a radially extending gap.

Advantageously, the magnet and pick-up device are located at the commutator end of the rotor shaft at a position outboard of the bearing supporting the end of the shaft to facilitate mounting of the magnet and pick-up device during assembly of the tool.

Additional objects and advantages of the present invention will become apparent from a reading of the detailed description of the preferred embodiments which makes reference to the following set of drawings in which:

BRIEF DESCRIPTION OF THE DRAWINGS

FIG. 2 is a plan view of the carrier for mounting the Hall effect device of the tachogenerator;

FIG. 3 is a side elevational view of the carrier and Hall effect device shown in FIG. 2;

FIG. 4 is a plan view of the ring magnet of the tachogenerator;

FIG. 5 is a sectional view of the ring magnet shown in FIG. 4 taken along line 5—5;

FIG. 6 is a sectional view of the ring magnet fitted to the bushing which is secured to the free end of the rotor shaft of the motor;

FIG. 10 is a modification of the circuit diagram of FIG. 9 illustrating a speed control circuit conforming to the block diagram of the preferred embodiment of the present invention shown in FIG. 7; and FIG. 11 is a timing diagram relating to the speed control circuit illustrated in FIG. 10.

DETAILED DESCRIPTION OF THE PREFERRED EMBODIMENTS

Figure 1:
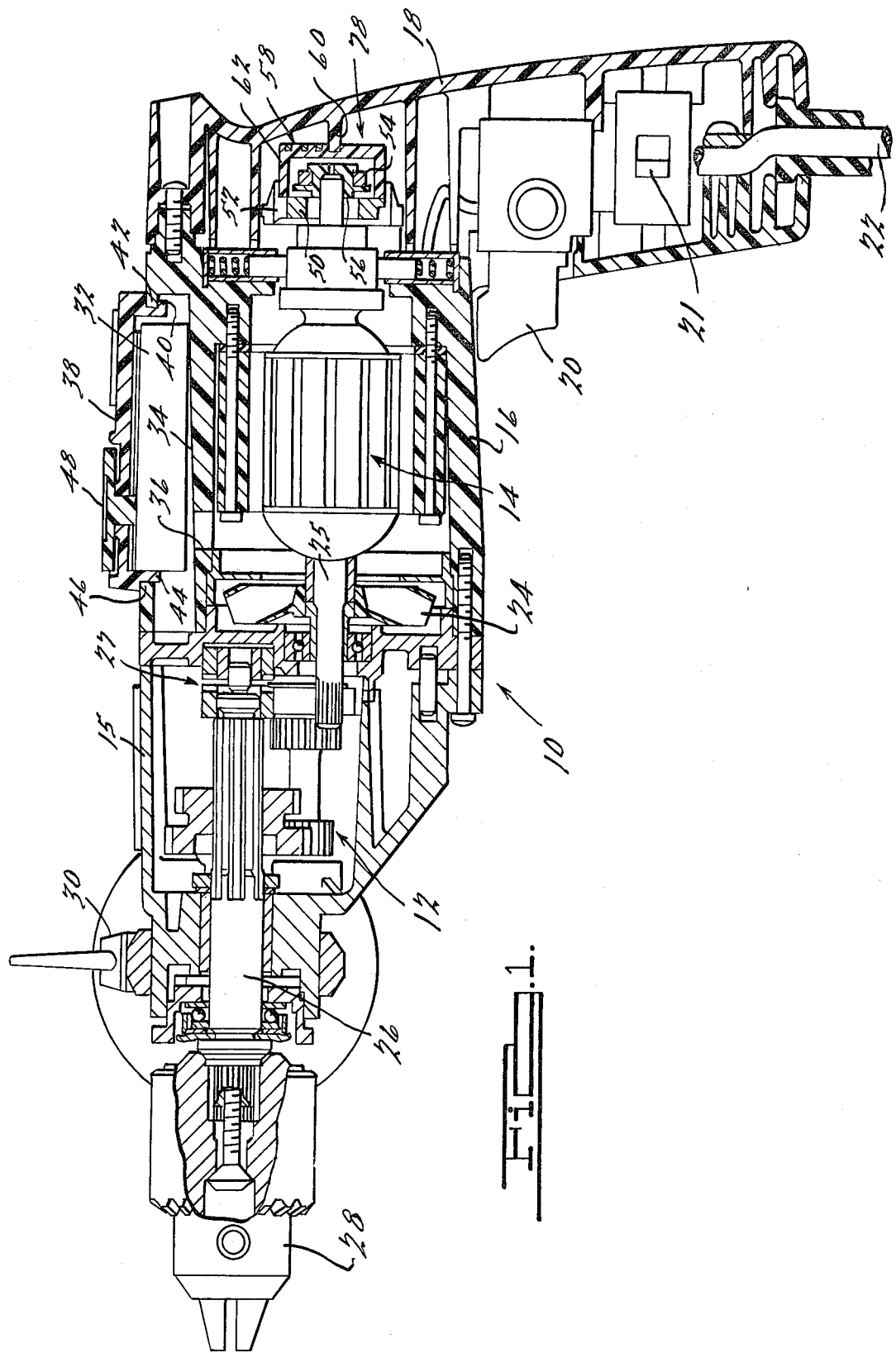
FIG. 1 is a vertical sectional view of a hammer-drill embodying the speed control circuit of the present invention.

Referring to FIG. 1, an impact or hammer-drill 10 incorporating a speed control apparatus according to the present invention is shown. It is to be emphasized that although the preferred embodiment herein discloses a hammer-drill to which the present invention is particularly suited, the speed control system of the present invention is applicable to other types of portable power tools including rotary hammers and conventional drills.

The hammer-drill 10 is conventional in overall layout, comprising a motor 14 disposed within the outer tool housing 16 which in part defines a pistol grip-type handle 18 incorporating an ON/OFF trigger-type switch 20. Conveniently, the reversing switch 21 is also mounted in the handle 18 adjacent the ON/OFF switch 20. Power to the tool 10 is supplied via the usual power cord 22 extending from the bottom of the handle 18. A fan 24 is affixed to the shaft 25 of the motor 14 to facilitate cooling of the tool 10. In the preferred embodiment the motor 14 drives an output spindle 26 through a speed reduction gear mechanism 12 which is disposed in a gear case 15 fastened to the forward end of housing 16. The gear mechanism 12 driving the output spindle 26 includes a ratchet mechanism 27 for imparting an oscillating axial motion to the output spindle to provide the percussive action in the hammer-drill mode. The spindle 26 extends outwardly beyond the front of gear case 15 and has affixed to its exposed end a chuck 28 for securing a drill bit thereto. An additional auxiliary handle 30 is mounted to the front end of gear case 15 to provide means for supporting the forward end of the tool 10. A rotary select knob (not shown) exposed through an opening in the side of gear casing 15 is provided for selecting between hammer-drill or drill only operation of the tool 10.

The upper surface of the housing 16 has a recess 32 formed therein to provide accommodation for the printed circuit board assembly containing the speed control electronics of the present invention. The recess 32 has a floor 34 separating it from the motor 14, thereby providing both a degree of physical protection and a thermal barrier between the motor 14 and the printed circuit board assembly. An aperture 36 is formed in the forward end of the floor 34 of the recess 32 adjacent the cooling fan 24 to allow cooling air to be drawn over the printed circuit board assembly. Cooling air enters the recess 32 through one or more apertures at the rear end of the recess.

The recess 32 is closed by a cover 38 with a depending hook-type flange 40 adapted to engage under an adjacent lip 42 at the rear end of the recess 32. At its forward end, the cover 38 has another depending flange 44 which fits against adjacent lip 46 at the forward end of the recess 32. Screws can be used to hold the cover 38 in place. Extending through an aperture in the top of the cover 38 is a control knob 48 which is adapted to be connected to the spindle of a potentiometer mounted to the printed circuit board assembly. The control knob 48 is thus accessible to the operator for selecting the desired forward and reverse operating speeds of the drill 10.

The commutator end of the rotor shaft 25 of the motor 14 is supported by a ball bearing 50 which is mounted in a bearing seat 52 formed in the housing 16. The rotor shaft 25 extends beyond support bearing 50 and has mounted thereto for rotation therewith a permanent ring magnet 54 having its magnetic poles lying at its periphery. A bushing 56, made of non-magnetic, electrically insulating material such as nylon, is fitted between the ring magnet 54 and the rotor shaft 25. With additional reference to FIGS. 4–6, the bushing 56 is molded on to the ring magnet 54 and has the general configuration of a bobbin. The ring magnet 54 is keyed to the bushing 56 via keying slots 55 and preferably comprises four equi-spaced alternate poles around its periphery.

Press fitted into the enlarged portion of the bearing seat 52 is a cup-shaped carrier 58 having a circular base and a cylindrical peripheral wall with an inside diameter slightly greater than the outer diameter of ring magnet 54. As best shown in FIG. 1, the carrier 58 is seated over the free end of the rotor shaft 25 so as to cover the bushing 56 and ring magnet 54 assembly and is held in place by a stud 60 projecting from the rear wall of the handle 18. With additional reference to FIGS. 2 and 3, the peripheral wall 62 of the carrier 58 is recessed at 64 to receive a Hall effect device 66. The thickness of the peripheral wall 62 of the carrier 58 is greatly reduced at recess 64 to provide minimum separation between ring magnet 54 and the Hall effect device 66. The ring magnet 54 and the carrier 58 are dimensioned to provide a predetermined radial gap between the poles of ring magnet 54 and the Hall effect device 66 so that the Hall effect device 66 comes within the magnetic field of the poles of the ring magnet 54 as they rotate past the Hall effect device. In addition, it will be appreciated that the size of the radial gap is unaffected by the slight axial movements of the armature shaft 25 which generally occur in practice due to manufacturing tolerances. Moreover, by locating the ring magnet 54 and Hall effect device 66 at the free end of the rotor shaft 25 extending beyond the bearing 50, installation of the tachogenerator 78 is greatly facilitated during assembly of the tool.

Figure 7:
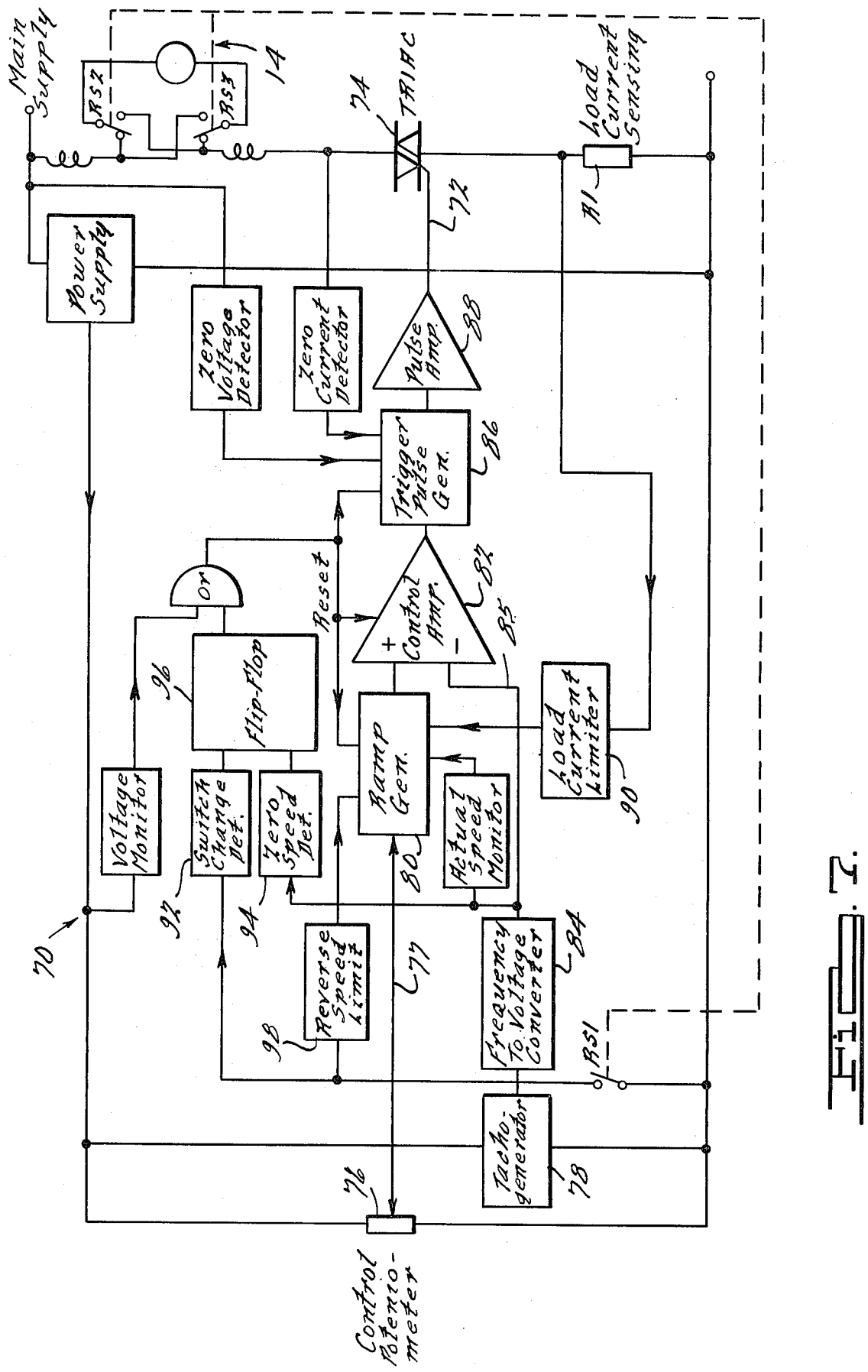
FIG. 7 is a block diagram of the preferred embodiment of the speed control circuit of the present invention.

Turning now to FIG. 7, a block diagram of a speed control circuit according to the present invention is shown. The speed control circuit, indicated generally at 70, is adapted to generate a control signal on line 72 which determines the firing angle of a TRIAC 74 connected in series with the motor 14 across an a.c. supply line, thereby controlling the rotational speed of the motor. Variation of the control signal on line 72 is effected by adjusting the setting of a speed control potentiometer 76, which is accessible to the operator via the control knob 48 previously noted in FIG. 1. Thus, the operator is able to select the desired rotational speed of the motor by setting the position of the potentiometer 76 accordingly. Moreover, the speed control circuit 70 is adapted to maintain the rotational speed of the motor at the selected speed setting under varying load conditions. For this purpose, the tachogenerator 78 is provided which is driven by the motor and is adapted to generate a speed signal having a frequency proportional to the rotational speed of the motor.

The speed control circuit 70 preferably includes a ramp generator 80 which is adapted to provide the tool with a "soft start" capability by controlling the acceleration of the motor from zero to the preselected motor speed determined by the signal on line 77 from potentiometer 76. Once the motor has been brought up to the preselected speed, the output of the ramp generator 80 will correspond to the set speed signal on line 77 from the potentiometer 76. The output from the ramp generator 80 is provided to one of the inputs of a control amplifier 82 which has its other input connected to the output of a frequency-to-voltage converter 84. The frequency-to-voltage converter is adapted to convert the incoming speed signal from the tachogenerator 78 to a corresponding d.c. signal whose value is proportional to the frequency of the speed signal from the tachogenerator 78. Thus, control amplifier 82 compares the actual speed value on line 85 with the set speed value from the output of the ramp generator 80 and produces an output signal in accordance with the magnitude of the difference therebetween for controlling the firing angle of the TRIAC 74. In particular, the output signal from control amplifier 82 is provided to a trigger pulse generator 86 which is adapted to time the generation of the trigger pulse in accordance with the magnitude of the controlled amplifier output signal. The trigger pulse generator 86 also determines the duration of the trigger pulse which is then amplified by pulse amplifier 88 and provided to the gate of TRIAC 74.

Reversal of the direction of motor rotation is effected by a reversing switch RS having contacts RS2 and RS3 connected between the field coils and the armature of the motor 14. The motor preferably has a split field coil as shown which is easier to construct and tends to reduce the generation of transients that may give rise to interference of radio frequencies. Reversing switch RS also has an additional contact RS1 which is normally closed when the motor 14 is operated in the forward direction and opened when the reversing switch RS is positioned to cause reverse rotation of the motor. A switch change detector 92 connected to contact RS1 is adapted to sense whenever a charge occurs in the state of contact RS1 and produce an output signal in response thereto which in turn causes the output state of a bistable flip-flop 96 to change from a LO level to HI level, thereby disabling the ramp generator 80, control amplifier 82 and trigger pulse generator 86. With the trigger pulse generator 86 disabled, the TRIAC 74 does not conduct and the motor 14 runs down. When the motor stops, a zero speed detector 94 connected to the output of the frequency-to-voltage converter 84 produces an output signal which is provided to the other input of flip-flop 96 to change its output from a HI level back to a LO level and thereby re-enable the ramp generator 80, control amplifier 82 and trigger pulse generator 86. The motor 14 then operates in the reverse direction relative to its previous direction of rotation. Thus, it will be appreciated that in the event the state of reversing switch RS is changed while the motor is rotating, the speed control circuit shown in FIG. 7 will first disconnect power to the motor and wait until the motor has run down to zero before reapplying power in the reverse direction. In this manner, possible damage to the motor and the generation of an abrupt reaction torque are avoided.

In addition, it will further be noted that the speed control circuit according to the present invention also includes circuit means for limiting the maximum voltage available at the output of the ramp generator 80 when contact RS1 is open. This limitation is effective to set a limit on the maximum rotational speed attainable by the motor in the reverse direction. A reverse speed limit circuit 98 is provided which is responsive to the opening of contact RS1 to limit the ramp height attainable by the ramp generator 80. Alternatively, the output of reverse speed limit circuit 98 could be applied to limit the magnitude of the signal appearing on line 77 and, in this way, control the ramp height attainable by the ramp generator 80. The maximum reverse speed value is so chosen that problems due to poor commutation are kept to an acceptable level. The potentiometer 76, however, is still effective to control the rotational speed of the motor in the reverse direction up to the maximum permitted reverse speed.

The speed control circuit also includes a current limiter 90 which is connected to the ramp generator 80 to insure safe operation of the tool by reducing the speed of the motor if a preset current level is exceeded. When energized, current flow through the motor provides an a.c. input to the current limiter circuit 90 via a load sensing resistor R1. If an input above a preset level is received, the current limiter 90 will reduce the output of the ramp generator 80 and thereby reduce the speed of the motor accordingly.

Figure 8:
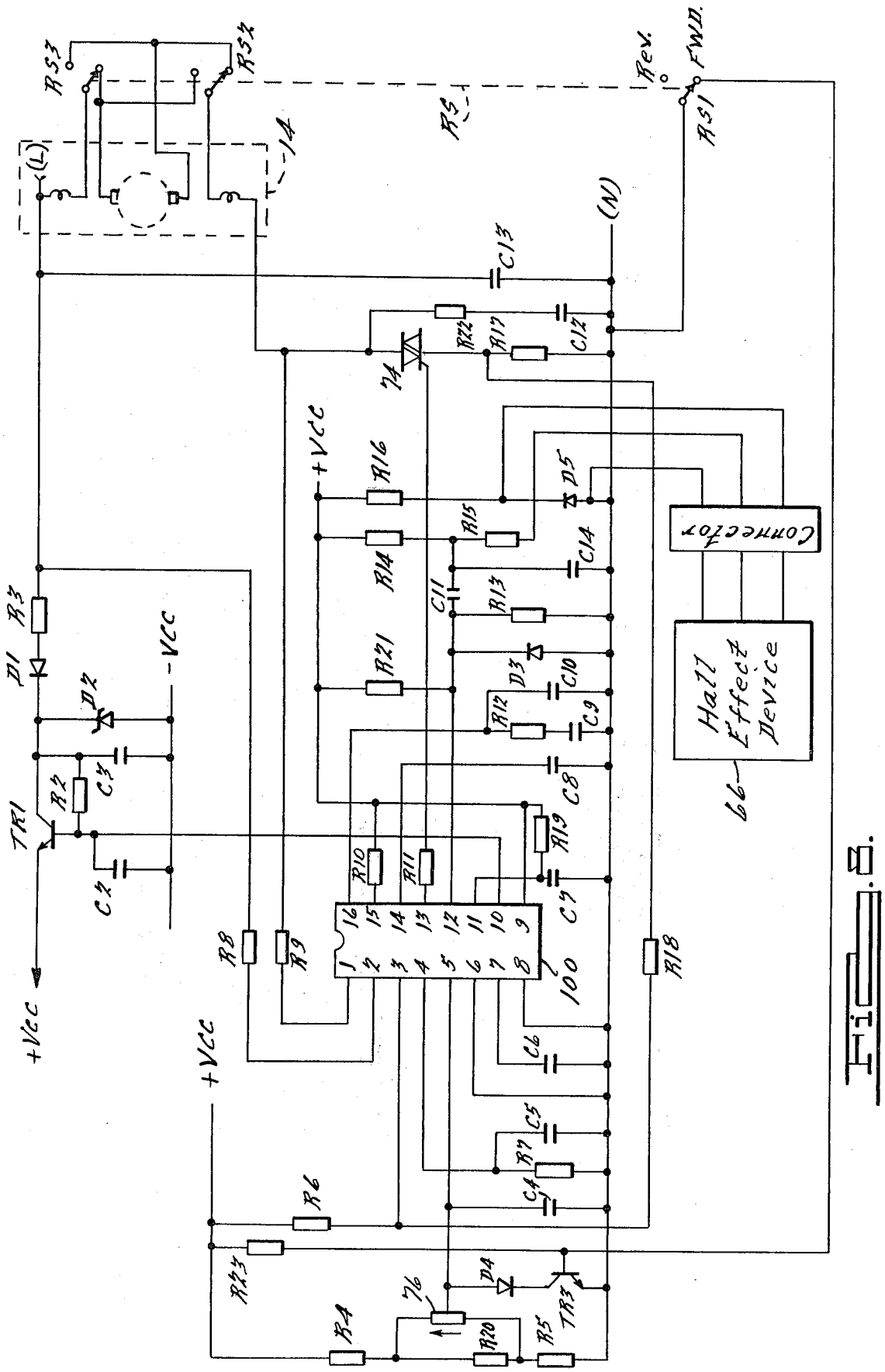
FIG. 8 is a circuit diagram of an alternative embodiment of the speed control circuit of the present invention.

Turning now to FIG. 8, a circuit diagram of an alternative embodiment of the speed control circuit according to the present invention is shown. The heart of the speed control circuit is an integrated circuit 100, which in the preferred embodiment is a Type TDA1085A manufactured by Motorola Inc., although other suitable integrated circuits may be used. The preferred Hall effect device is a Type TL 170 CLP manufactured by Texas Instruments, Inc. A description of the integrated circuit 100 is provided below in connection with the discussion of FIG. 9.

Speed limitation in the reverse direction is provided by a transistor TR3 which has its base-emitter junction short-circuited for forward rotation of the motor 14. Opening of the switch contact RS1 permits TR3 to conduct thereby placing a forward biased diode D4 in parallel with the potentiometer 76 and a resistor R5. The diode D4 provides a 0.6 V voltage limitation, on the potentiometer output voltage, which corresponds to a maximum reverse rotational speed of the motor armature of approximately 6000 rpm, as compared with a maximum speed of approximately 30,000 rpm in the forward direction.

It will be appreciated that any device whose conducting characteristic is suitable may be used in place of the forward biased diode D4, for example, a Zener diode.

The Hall effect device 66, which includes an output amplifier, is powered from the supply line Vcc via resistors R14 and R16. The output voltage from device 66 is applied to terminal 12 of integrated circuit 100 via a coupling and filtering circuit comprising capacitors C11 and C14, diode D3, and resistors R21, R13 and R15.

The integrated circuit 100 employs an external voltage regulator comprising a transistor TR1 and its associated circuitry. Transistor TR1 is powered from the main supply via a dropping resistor R3 and a diode rectifier D1 whose output is clamped by a Zener diode D2. Capacitor C3 provides a degree of smoothing. An "on-chip" regulator adjusts the base current of transistor TR1 as necessary to give a stabilized voltage a the emitter of TR1. This external power circuit permits the use of a physically smaller voltage dropping resistor, shown here as R3, which saves power and reduces waste heat. In addition a lower value capacitor, shown here at C3, can be used.

Figure 9:
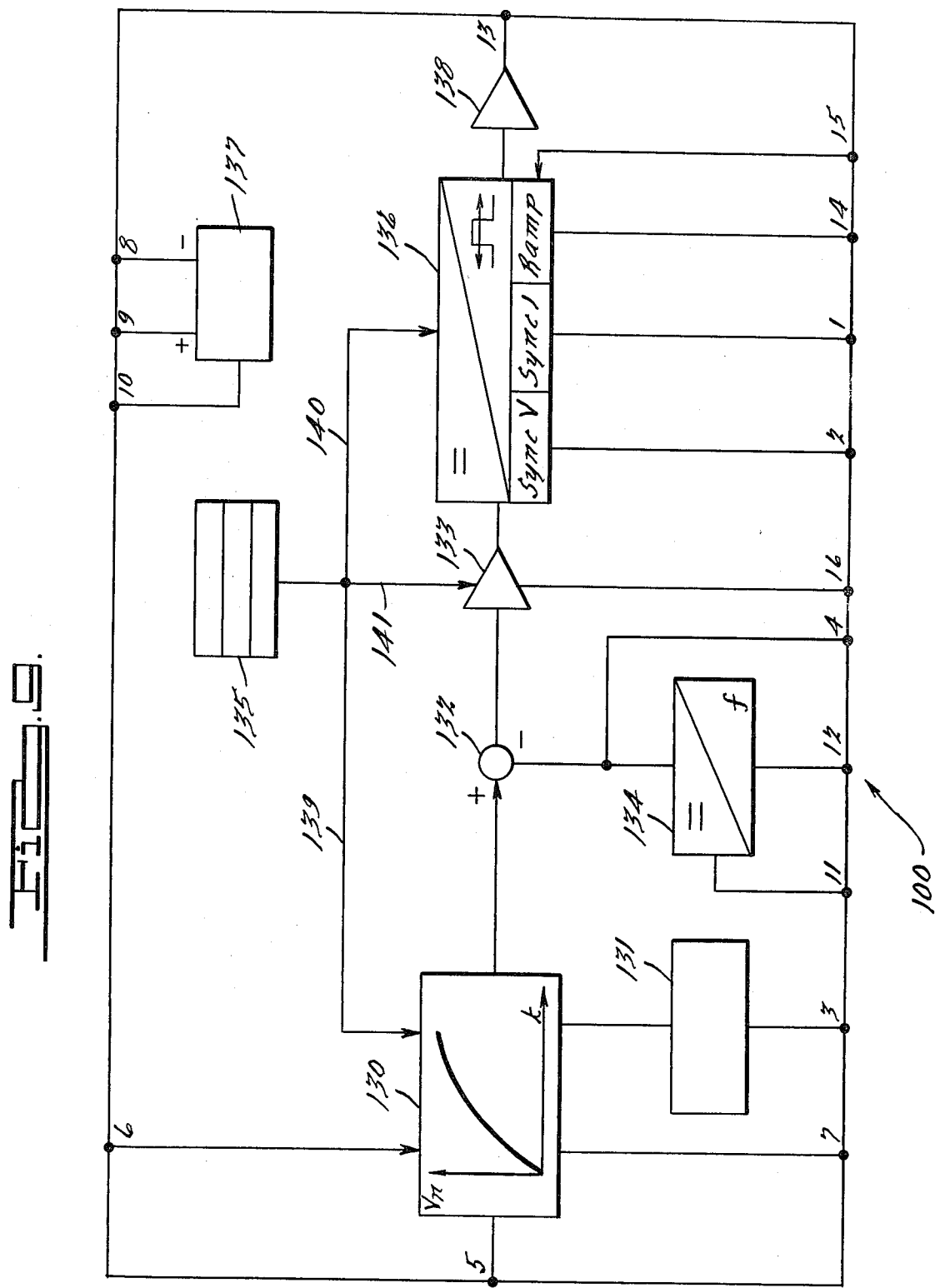
FIG. 9 is a block diagram of the integrated circuit component in FIG. 8.

Resistive and capacitive components of the motor speed control circuit shown in FIG. 8 may be identified functionally as follows:

(i) C4 is a filtering capacitor intended to reduce the noise generated at the potentiometer 76 contact;

(ii) R19 and C7 together set the conversion ratio of the frequency to voltage converter;

(iii) R7 and C5 provide smoothing of the tachogenerator output;

(iv) C6 provides the soft start ramp;

(v) C8 in conjunction with resistor R10 controls the timing of the trigger pulse generator 135 (FIG. 9), and C8 also determines the pulse width;

(vi) R11 is an output resistor which controls the gate drive current to the triac 74;

(vii) C9, C10, R12 provides electrical compensation for the control amplifier 133 (FIG. 9);

(viii) R8, R9 provide voltage and current synchronization inputs, respectively, for integrated circuit 100;

(ix) R17 provides load current sensing, and corresponds to resistor R1 of FIG. 7;

(x) R6, R18 set the level to which the current limiter 131 (FIG. 9) operates; and (xi) R22, C12 are required to limit the rate of voltage rise at triac 74 to reduce the chance of false triggering at turn-off.

Referring to FIG. 9, a block schematic diagram of the integrated circuit semi-conductor component 100 sold commercially by the Motorola Company under the designation TDA 1085A, is shown. This component 100 includes a ramp generator 130 to which is applied a reference voltage at terminal 5. This reference voltage is derived from control potentiometer 76 (FIG. 8) and corresponds to the desired rotational speed. As the transfer characteristic indicates, the ramp generator 130 generates an output voltage Vn which changes as a function of time. The voltage Vn increases from zero to a value determined by the magnitude of the voltage applied at terminal 5.

The output voltage of the ramp generator 130 is fed to a summing junction 132. A voltage corresponding to the actual rotational speed is also applied to the summing junction 132. This voltage is generated with the aid of a frequency-to-voltage converter 134 to which a frequency signal can be applied via terminal 12. Converter 134 converts the frequency signal into a direct-current voltage which is available at terminal 4.

The output voltage of the summing junction 132 is applied to a transformer 136 via the control amplifier 133. The trigger pulse generator 136 converts the direct-current output voltage of the control amplifier 133 voltage to a proportional firing angle of triac 74. A sawtooth generator is synchronized via resistor R8 on terminal 2 (FIG. 8) to the line voltage via a detector circuit which detects the zero crossover of the line voltage. In addition, the current zero is detected by the logic at terminal 1 via resistor R9 (FIG. 8) to guarantee that the optimum firing angle is provided in the event of a phase shift.

The sawtooth is generated by capacitor C8 (FIG. 8) which is discharged by a current source set by resistor R10 (FIG. 8) on terminal 15. When the output voltage of the sawtooth generator is equal to the output voltage of control amplifier 133, a pulse is produced and fed to the pulse amplifier 138 and serves in the conventional manner as the firing control of a triac arrangement. The conduction time of this triac arrangement is dependent upon the point in the line voltage waveform when the pulse is provided by the trigger pulse generator 136; thus, the earlier the pulse is delivered, the longer will the triac arrangement conduct. The larger the difference detected by the summing junction 132 between the output voltage of the ramp generator 130 and the voltage corresponding to the actual value of the rotational speed, the earlier will the pulse become available, referenced to the last zero crossover of the supply voltage and the greater will be the power applied to the motor.

The semi-conductor component 100 incorporates a current-limiting unit 131 which receives a signal proportional to the current being drawn by the motor from current-sensing resistor R17 (FIG. 8) and reduces the output of the ramp generator 130, and hence the rotational speed of the motor, whenever the magnitude of the current signal provided to terminal 3 exceeds a preset level. Further, a monitoring unit 135 is provided for monitoring the various conditions that lead to a reset. When a reset occurs, the monitoring unit 135 acts via lines 139, 141 and 140 to effect resetting of the ramp generator 130, control amplifier 133 and trigger pulse generator 136 respectively.

The semi-conductor component 100 also includes a voltage regulating unit 137 which provides a stabilised supply voltage at terminals 8 and 9. Terminal 10 may be connected to terminal 9, or to the base of transistor TR1 (FIG. 8) as discussed.

The speed control circuit shown in FIG. 8 will operate in the following manner. As previously noted, when reversing switch RS is placed in the reverse position, transistor TR3 is rendered conductive, thereby limiting the magnitude of the set speed signal from potentiometer 76 to the voltage drop across forward biased diode D4, which in this embodiment corresponds to a limitation of approximately 0.6 volts. This, in turn, limits the reverse rotational speed of the armature to approximately 6000 rpm, which as also noted previously, keeps problems due to poor commutation to an acceptable level.

In the event the reversing switch RS is switched from the forward to reverse while the motor is rotating at a relatively high rate of speed, a sudden large difference will exist between the actual motor speed as measured by the tachogenerator 78 and the set motor speed, which by virtue of the action of transistor TR3 and diode D4 will now be limited to a relatively slow speed value. The integrated circuit 100 responds to this large difference via summing junction 132, control amplifier 133 and trigger pulse generator 136 to produce a zero firing angle for the triac arrangement, thereby removing power to the motor. The motor will subsequently coast down until the actual armature speed as measured by the tachogenerator corresponds to approximately 6000 rpm. At this point, the integrated circuit 100 will re-enable the trigger pulse generator 136, thereby reapplying power to the motor in the reverse direction. Thus, it will be appreciated that by permitting the motor to coast down to a relatively slow speed before power is applied in the reverse direction, the reaction torque associated with the sudden reversal in the direction of rotation of the motor is minimized.

Turning now to FIG. 10, a modification of the circuit diagram of FIG. 9 illustrating a speed control circuit in accordance with the block diagram of the preferred embodiment in FIG. 7 is shown. In this embodiment, it will be recalled, the motor must first come virtually to rest before power in the opposite direction is applied. Thus, if the reversing switch RS is actuated while the motor is running, power to the motor must first be removed until the speed of the motor has coasted town to zero, before power is reapplied in the opposite direction. The circuit modifications in FIG. 10 illustrate a practical way of implementing this feature. The components within the dashed line are available in integrated circuit form in IC TYPE NE555, manufactured by Signetics Corporation.

Resistors R25–R29, capacitor C15, transistor TR4 and comparator 110 together comprise a switch change detector circuit which is adapted to produce a momentary pulse at the reset input (R) of flip-flop 96 each time the reversing switch contact RS1 (FIG. 8) is either opened or closed. In particular, when reversing switch contact RS1 is opened, the voltage at the positive input to comparator 110 will begin to rise as capacitor C15 charges through resistors R25 and R26. When the signal at the positive input of comparator 110 attains a potential of approximately 3.3 volts, the output of comparator 110 will go HI. Thereafter, capacitor C15 will continue to charge until a potential of approximately 10 volts is attained, at which point transistor TR4 will become conductive due to the voltage divider arrangement consisting of resistors R28 and R29. With transistor TR4 conducting, the voltage applied to the positive input of comparator 110 will be reduced substantilly to zero, thereby causing the output of comparator 110 to revert to a LO level. The duration of the pulse produced at the output of comparator 110 is determined by the time constant associated with capacitor C15. When reversing switch contact RS1 is closed, the above-described sequence is reversed and another pulse is produced at the output of comparator 110.

The momentary output pulse generated by comparator 110 whenever the state of reversing switch contact RS1 is changed, causes flip-flop 96 to become reset, thereby producing a HI signal at its Q̄ output, which effectively serves to reset IC 100 (FIG. 8) via resistor R33 and transistor TR5. Specifically, although the RESET line (139–141 FIG. 9) of IC 100 is not directly available on any external pins, when transistor TR5 is rendered conductive by the HI pulse produced at the Q̄ output of flip-flop 96, the voltage applied to pin 5 of IC 100 is reduced substantially to zero. This is interpreted as a "reset" condition by additional circuitry within IC 100, which then drives the internal RESET line 139–141 via an OR-gate. Thus, whenever reverse switch contact RS1 is operated, the trigger pulse generator 136 (FIG. 9) is disabled and no power is applied to the motor. The motor accordingly runs down to zero speed under its own inertia.

Comparator 122 together with transistor TR6, potentiometer R14 and resistor R34, comprise a zero speed detector circuit. In particular, the output from the frequency-to-voltage converter 134 (FIG. 9) within IC 100 is provided at pin 4 to the base of transistor TR6. When the speed of the armature drops to approximately 2000 rpm, transistor TR6 will be rendered conductive, thereby reducing the voltage applied to the negative input of comparator 112 to a value below 1.67 volts. This, in turn, causes the output of comparator 112 to go HI, thereby setting flip-flop 96 and causing its Q output to go LO, turning off transistor TR5 and removing the reset condition in IC 100. Accordingly, the trigger pulse generator 136 (FIG. 9) is re-enabled and power is reapplied to the motor in the opposite direction under the normal "soft-start" characteristic of IC 100. The timing relationships of the above-described signals are illustrated in the accompanying timing diagram shown in FIG. 11.

As has been indicated above, the speed control may be provided by a microprocessor programmed to effect the control functions already described. Both digital and analog techniques can be used.

The microprocessor may also provide other facilities, for example, a visual indication of speed and/or of the direction of rotation. The speed control may be responsive to inputs indicating particular characteristics of material to be operated upon for example, in the case of a power drill, of the type of material to be drilled.

While the above description constitutes the preferred embodiments of the present invention, it will be appreciated that the invention is susceptible to modification, variation and change without departing from the proper scope or fair meaning of the accompanying claims.

What is claimed is:

1. An electric power tool, comprising:
   an electric motor for driving an output spindle having connected thereto means for receiving a tool implement;
   said motor having its commutator brushes slightly shifted from the neutral position to provide for better commutation in the forward direction of rotation;
   switch means operable between forward and reverse positions for changing the direction of rotation of said motor from a forward direction to a reverse direction and vice versa by controlling the polarity of the power applied to said motor;
   control circuit means for controlling the speed of rotation of said motor in both rotational directions by controlling the magnitude of the power applied to said motor, said control circuit means comprising a potentiometer, a ramp generator, reverse speed limiting means, a zero speed detector, a switch change detector, and a flip-flop;
   said potentiometer being adjusted to provide a set speed signal to the ramp generator to determine the power applied to the motor;
   said reverse speed limiting means being rendered operative when said switch means is in the reverse position to limit the ramp height attainable by said ramp generator to limit the maximum speed of the motor in said reverse direction to below that attainable in said forward direction to keep problems in the reverse direction due to poor commutation to an acceptable level;
   said switch change detector actuating said flip-flop each time said switch means is actuated to disable the ramp generator and cut off supply of power to the motor; and
   said zero speed detector actuating said flip-flop to remove its disabling effect and re-establish the supply of power to the motor when the motor speed has dropped to zero.

2. An electric power tool, comprising:
   an electric motor having commutator brushes slightly shifted from the neutral position to provide better commutation in the forward direction of rotation;
   switch means for changing the direction of rotation of said motor from a forward direction to a reverse direction and vice versa by controlling the polarity of the power applied to said motor;
   speed sensing means for sensing the rotational speed of said motor and producing an actual speed signal in accordance therewith;
   select means for selecting a desired motor speed and producing a set speed signal in accordance therewith;

speed control circuit means for controlling the rotational speed of said motor in both rotational directions by comparing said actual speed signal with said set speed signal and controlling the magnitude of the power applied to said motor in accordance with the difference therebetween;

reverse speed limit means for limiting the magnitude of the power available to said motor when said switch means is set for the motor to rotate in the reverse direction to limit the speed of rotation in the reverse direction to a maximum which is substantially below the maximum speed of rotation in the forward direction;

said reverse speed limit means causing power to be removed from said motor when said switch means is set for the motor to rotate in the reverse direction while the speed of rotation of said motor in the forward direction is greater than the value of said reverse speed maximum, power being re-applied to the motor when the motor speed drops to the level of the value of said reverse speed maximum; and said select means comprising a manually adjustable potentiometer, and said reverse speed limiting means comprising a diode connected to a transistor, said transistor having its base-emitter junction short-circuited when said switch means is set for the motor to rotate in said forward direction and placing said diode in parallel with said potentiometer to limit the potentiometer output voltage when said switch means is set for the motor to rotate in said reverse direction.

* * * * *